Figure 1:
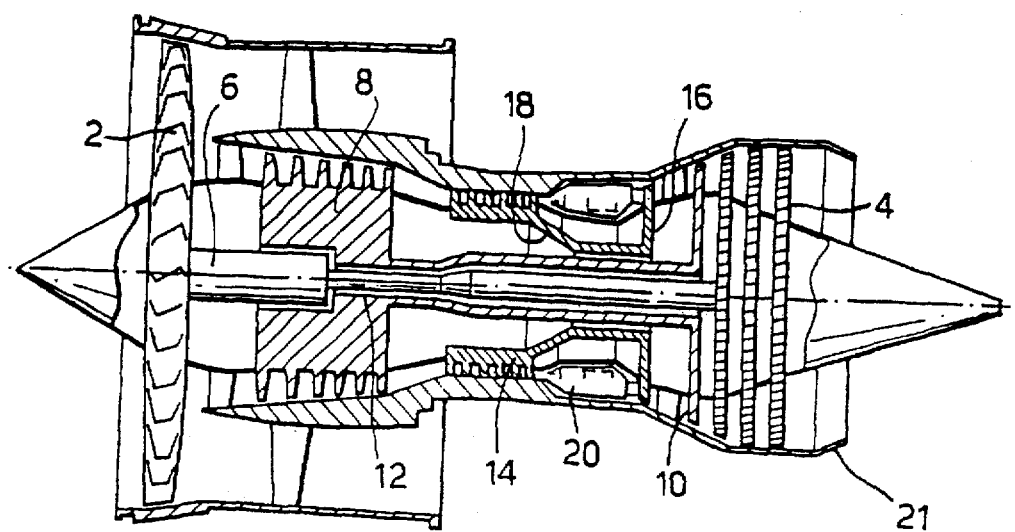

United States Patent [19]
Jones et al.

[11] Patent Number: 5,737,921
[45] Date of Patent: Apr. 14, 1998

[54] GAS TURBINE ENGINE FUEL INJECTOR

[75] Inventors: Leighton Jones, Bristol; John S. Richardson, Nottingham, both of England

[73] Assignee: Rolls-Royce plc, London, England

[21] Appl. No.: 425,401

[22] Filed: Apr. 20, 1995

[30] Foreign Application Priority Data

Apr. 20, 1994 [GB] United Kingdom .................. 9407820
Apr. 20, 1994 [GB] United Kingdom .................. 9407866

[51] Int. Cl.$^6$ .................................. F23R 3/10; F23R 3/14
[52] U.S. Cl. ............................. 60/740; 60/748; 239/405
[58] Field of Search .................................. 60/39.23, 737, 60/740, 743, 748, 749, 756; 239/399, 402, 404, 405, 406, DIG. 7

[56] References Cited

U.S. PATENT DOCUMENTS

| | | | |
|---|---|---|---|
| 3,638,865 | 2/1972 | McEneny et al. | 60/748 |
| 3,905,192 | 9/1975 | Pierce et al. | 60/39.23 |
| 3,961,475 | 6/1976 | Wood | 60/743 |
| 4,584,834 | 4/1986 | Koshoffer et al. | 60/39.23 |
| 4,766,722 | 8/1988 | Laboure et al. | 60/39.23 |
| 4,845,940 | 7/1989 | Beer | |
| 5,117,637 | 6/1992 | Howell et al. | 60/740 |
| 5,222,358 | 6/1993 | Chaput et al. | 60/740 |
| 5,315,815 | 5/1994 | McVey et al. | |

FOREIGN PATENT DOCUMENTS

| | | |
|---|---|---|
| 1 283 827 | 8/1972 | United Kingdom . |
| 2 035 540 | 6/1980 | United Kingdom . |
| 2 175 992 | 12/1986 | United Kingdom . |
| 2 232 479 | 12/1990 | United Kingdom . |

*Primary Examiner*—Michael Koczo
*Attorney, Agent, or Firm*—Oliff & Berridge

[57] ABSTRACT

A multi-stream fuel injector for a gas turbine engine comprises a plurality of concentric member which define a plurality of flow passages carrying HP compressor air or fuel/air mixture. One of the members is formed with a wide-angle, frusto-conical flared lip to propagate a wide-angle fuel/air mixture cone in the combustion region. The lip is of such a cross-sectional configuration that air flowing over the lip surface remains attached to the surface and flows in a non-turbulent manner, initially in a radially inward direction, and subsequently in a radially outward direction. The lip ensures that undesirable regions of recirculation are avoided around the fuel injector.

12 Claims, 4 Drawing Sheets

GAS TURBINE ENGINE FUEL INJECTOR

This invention relates to a gas turbine engine fuel injector. In particular, the invention concerns a multi-stream fuel injector for the combustor of a gas turbine engine.

A fuel injector of this type produces a generally conical pattern of swirling flows of air and/or an air/fuel mixture concentric with the longitudinal axis of the injector. The radially outward component of the conical flow from the injector can give rise to hot flow recirculation around the fuel injector outlet. Such flow recirculation regions are undesirable since they trap hot combustion products and can even support a flame. This, in turn, leads to local overheating of the fuel injector and surrounding combustor walls resulting in erosion damage and adverse thermal effects upon structures in the region of the fuel injector.

The present invention is intended to overcome these drawbacks by providing an improved fuel injector design which avoids hot flow recirculation regions.

According to the present invention a gas turbine engine fuel injector of the kind having a plurality of concentric passages comprises radially outwards of a fuel passage at least one passage for the flow therethrough of air, the downstream end of said passage having a radially inwardly directed annular lip, the cross-sectional shape of which is such that in said at least one passage air flowing over said lip remains attached to the surface of said lip so as to flow thereover in a substantially non-turbulent manner initially in a generally radially inward direction and subsequently in a generally radially outward direction.

Preferably in one arrangement a multi-stream fuel injector is installed in a combustor, wherein the fuel injector is located in an upstream wall of the combustor and the flared lip member is adapted to produce, in use, a radially outward flow of cooling air in contact with the face of the surrounding combustor wall.

In another arrangement the fuel injector is located in an upstream wall of the combustor and the flared lip member is adapted to produce, in use, a recirculation region of cooling air adjacent the combustor wall surrounding the injector.

Figure 2:
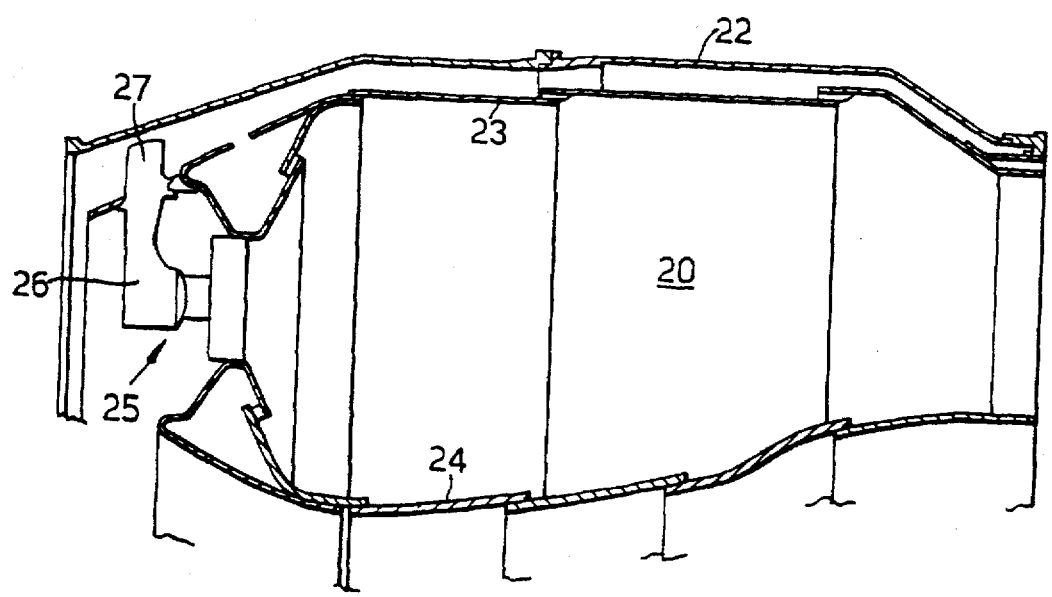
Figure 3:
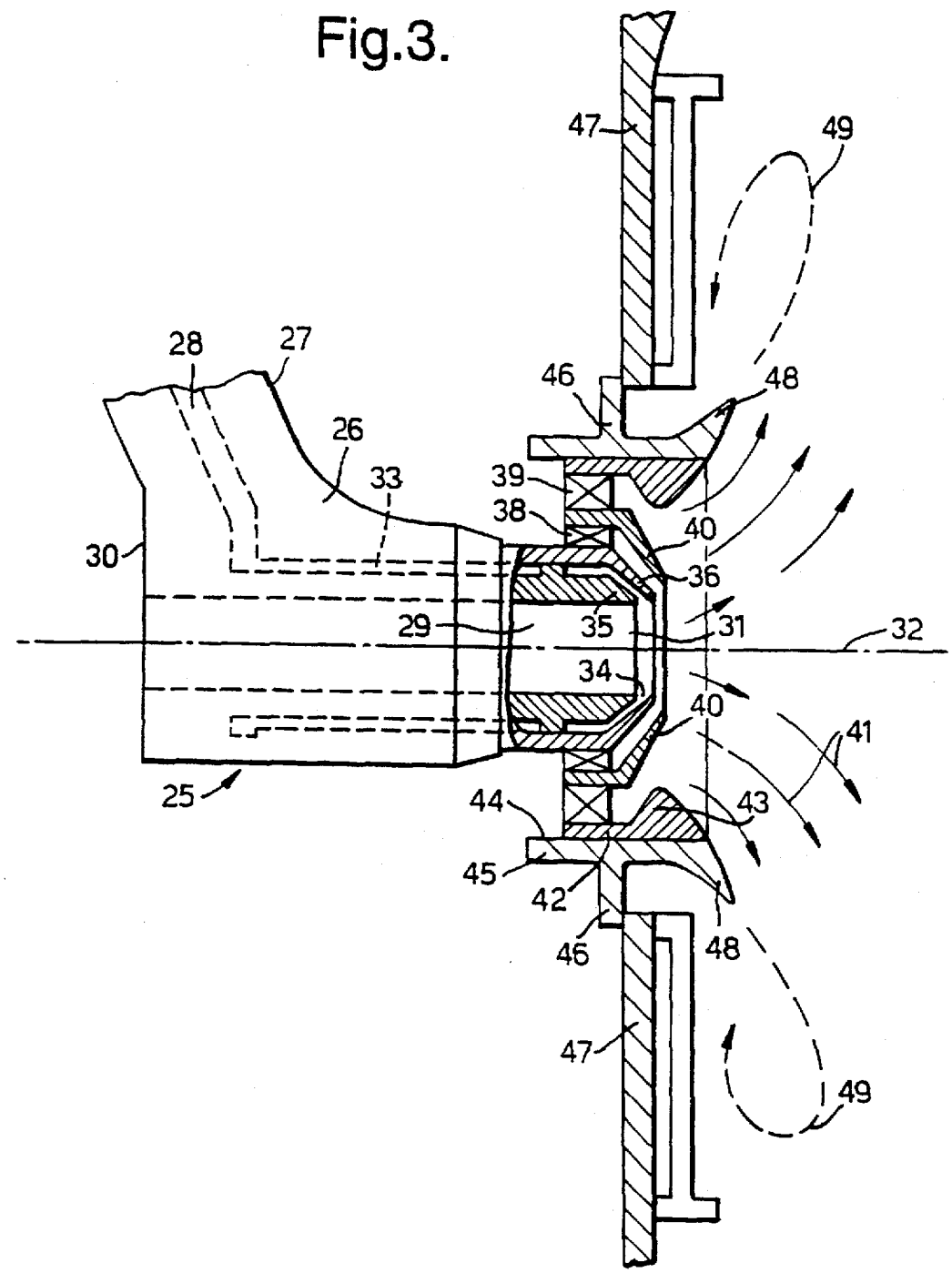
Figure 4:
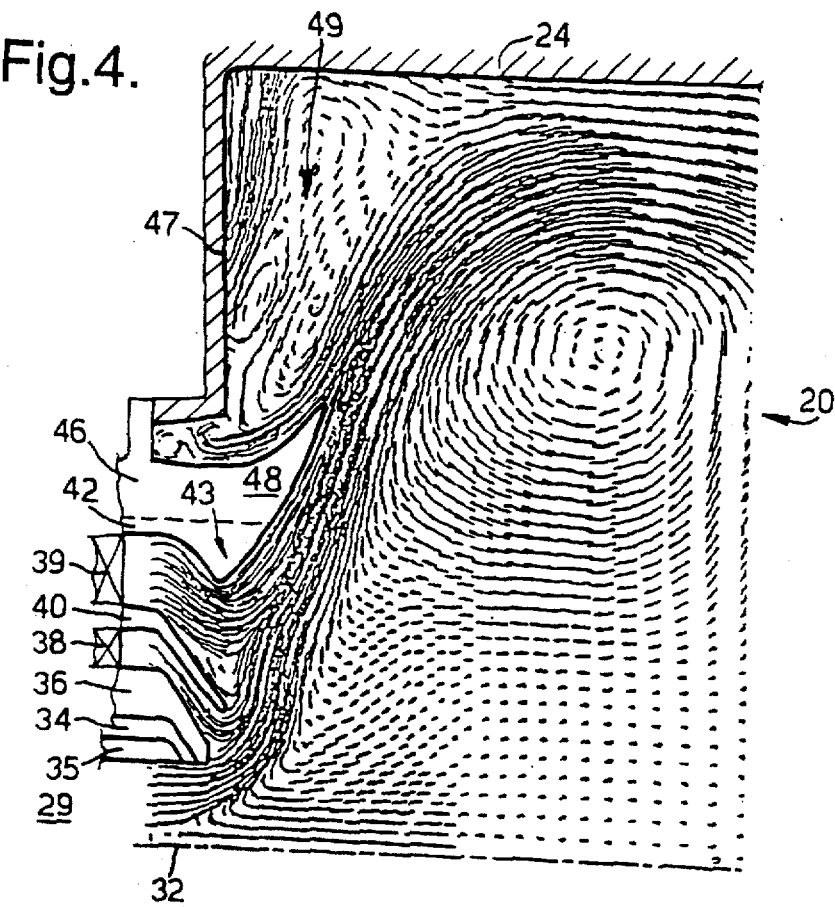
Figure 5:
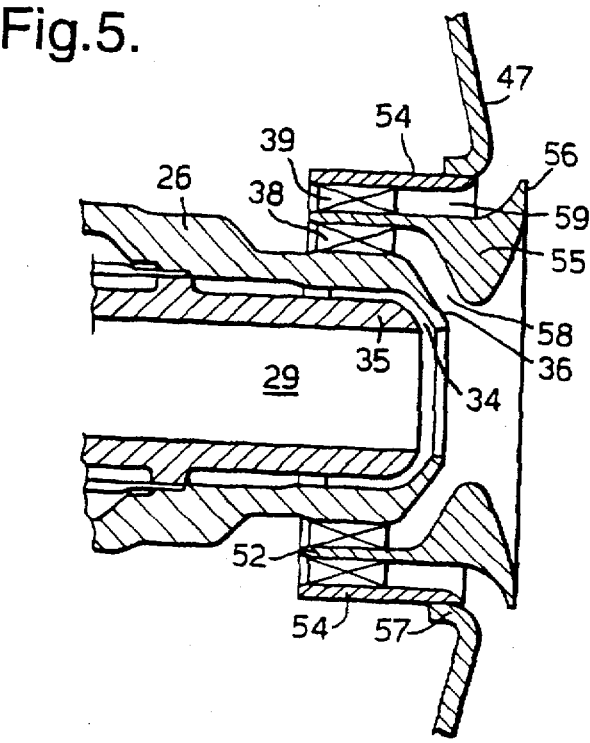
Figure 6:
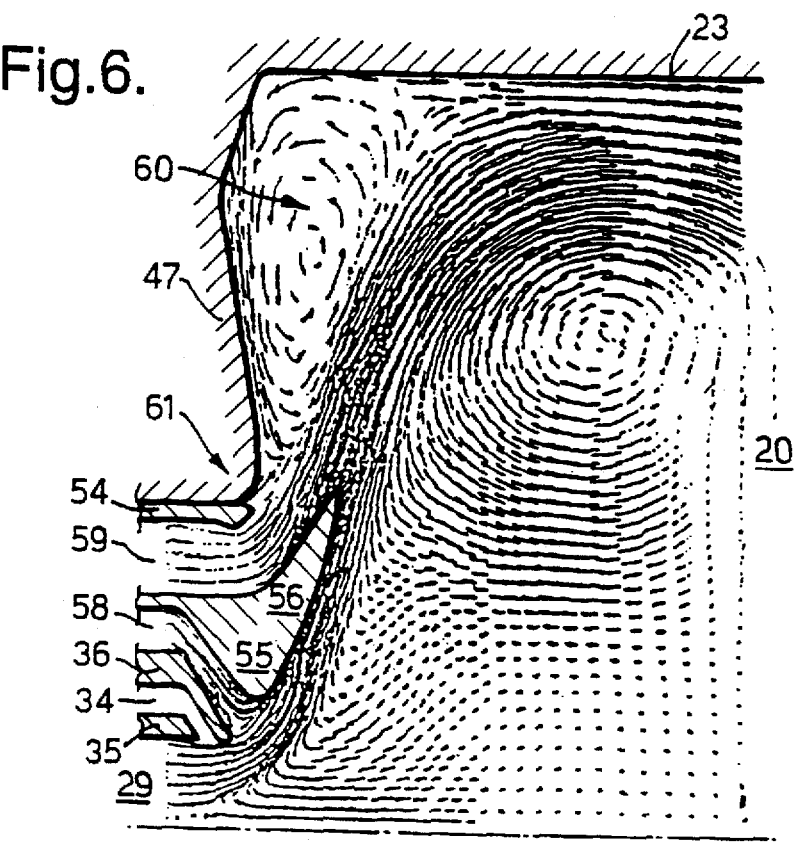
Figure 7:
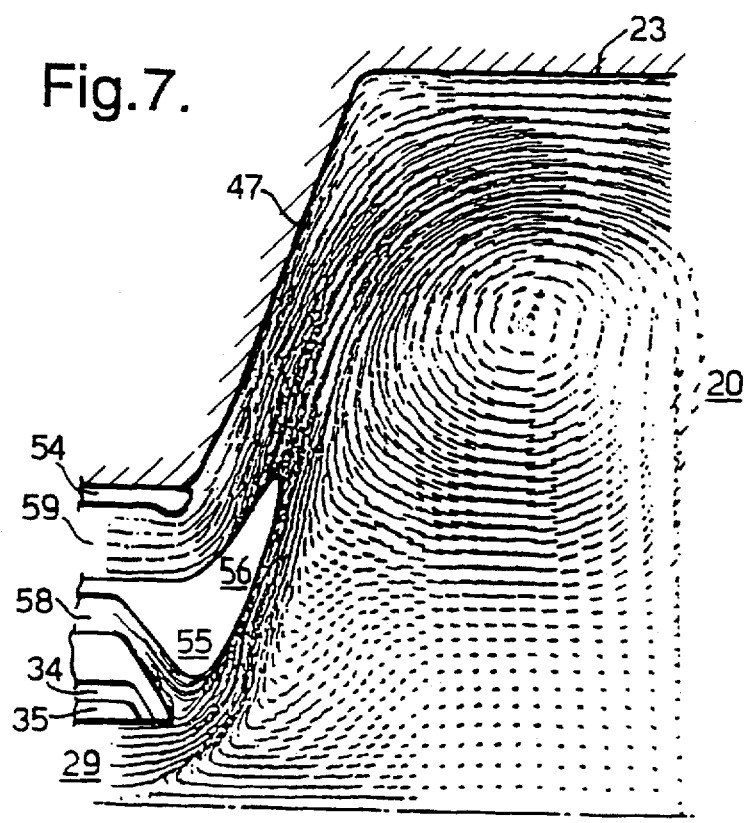

The present invention will now be described, by way of example, with reference to the accompanying drawings in which:

FIG. 1 is a schematic diagram of a ducted fan gas turbine engine having an annular combustor, FIG. 2 is a detail close-up view of part of the combustor of the engine of FIG. 1, FIG. 3 is a partially sectioned side view of a first embodiment of a fuel injector in accordance with the present invention as used in the combustor of FIG. 2, FIG. 4 illustrates a flow pattern of the multi-stream fuel injector of FIG. 3, FIG. 5 is a side view of an alternative, second embodiment of a fuel injector in accordance with the present invention, FIG. 6 is an illustration of the fuel/air, distribution pattern of the fuel injector of FIG. 5 with a first design of combustor end wall, and FIG. 7 is a corresponding illustration of the fuel/air distribution pattern of the fuel injector of FIG. 5 with a second design of combustor end wall.

With reference to FIG. 1, there is shown a three-shaft ducted fan gas turbine engine generally of generally conventional configuration. It will be understood, however, that the invention to described hereinafter may be found useful in other engine layouts. The engine of FIG. 1 comprises, in axial flow series: a low pressure spool consisting of a fan 2 driven by a low pressure turbine 4 via a first shaft 6; an intermediate compressor 8 driven by an intermediate pressure turbine 10 through a second shaft 12; and a high pressure compressor 14 driven by a high pressure turbine 16 via a third shaft 18; an annular combustor 20 and a propulsive nozzle 21.

A portion of the annular combustor 20 is shown in more detail in FIG. 2. In this and subsequent figures like parts have like references. The combustor 20 is located within a combustion chamber outer casing 22 which defines the outer boundary of the airflow region around the combustion chamber itself. The combustor or chamber 20 is formed by concentric outer and inner walls 23,24 respectively which converge towards their upstream ends, that is towards the left side of FIG. 2. The walls 23,24 thus define an annular chamber which is open at its downstream side, that is to the right of FIG. 2, leading to the high pressure turbine 16 (see FIG. 1).

Air is admitted to the interior of the combustion chamber 20 through a multiplicity of apertures formed in the walls 23,24 as is well known in the art. Fuel is injected into the region of combustion at the upstream end of the combustor 20 through a plurality of fuel injectors, of which one is indicated at 25, which are spaced apart around the upstream chamber wall formed by the convergence of the inner and outer walls 23,24. Further air is introduced into the combustion region through metering and effusion holes in the chamber walls.

Internal details of a first embodiment of a fuel injector 25 according to the invention is illustrated in FIG. 3. The injector comprises a main body 26 which is carried by the distal end of an arm 27. The arm 27 is formed with an internal fuel duct 28 through which fuel is supplied to the main body of the fuel injector 25.

The main body 26 of the injector has a central air passage 29 which is open at both ends and extends from its upstream end 30, on the left of FIG. 3, towards its downstream end 31, on the right. The passage 29 is concentric with a longitudinal axis 32 of the body 26 and fuel nozzle. The nozzle is defined by a series of concentric frusto-conical rings. An annular fuel gallery 33 is formed in the interior of the injector body 26 and receives fuel from the duct 28. The downstream end of the gallery 33 is formed into an annular orifice 34 by concentric generally frusto-conical rings 35,36 which direct the fuel issuing therefrom in a radially inward direction.

Radially outwards of the fuel orifice 34 are two further concentric rings 40,42. The inner of these rings 40 is mounted on the injector body 26 by means of an annular array of swirler vanes 38 and has a frusto-conical downstream shape surrounding the fuel orifice. The outer of the two rings 42 is similarly mounted on the inner ring 40 by means of a further array of swirler vanes 39 and is also shaped at its downstream end.

When high pressure air is delivered to the upstream end 30 of the fuel injector 25 by the high pressure compressor 14, some of that air flows through the central passage 29. This air interacts with the annular, radially inwardly directed film of fuel which issues from an annular orifice 34. Further high pressure air flows around the fuel injector main body 26 and through the two arrays of swirler vanes 38 and 39. The action of the vanes in conjunction with the frusto-conical shapes directs the air and fuel film initially in a radially inward direction. This swirling flow of air interacts with the fuel exhausted from the orifice 34 to cause atomization of the fuel. The interaction between the various fuel and air flows results in the atomized fuel being ejected from the fuel injector 25 into the combustor 20 in this initially convergent shape which expands in a divergent manner as indicated by the arrows 41.

The divergent flow of fuel and air is reinforced by the flow of air which is exhausted from the radially outermost array of swirler vanes 39. This outer ring 42 is provided at its downstream end with a smoothly profiled radially inwardly directed annular lip 43. The annular lip 43 extends across the flow path of the air exhausted from the radially outermost swirler vanes 39 so as to direct that air initially in a generally radially inward direction. However, the lip 43 has a flared configuration formed by a generally U-shaped cross-sectional shape. The shape is such that the air which flows over the surface of the lip 43 by virtue of the coanda effect remains attached to the surface. This ensures that the air flows over the surface in a generally non-turbulent manner and is also turned by coanda effect so that the air flow which finally exhausted from between the rings 40 and 42 is directed in a generally radially outward direction. Consequently this air flow forms a sheath of cool air on the upstream side of the cone of atomized fuel/air mixture flowing in the directions indicated by the arrows 41.

The fuel injector of FIG. 3 is designed as an integral assembly comprising the main body 26 together with the concentric rings 40 and 42. The radially outer surface of the outermost ring 42 is formed as a constant diameter cylindrical surface intended to fit into a parallel, smooth sided bore in the end wall of the combustor. In FIG. 3 this bore 44 is provided by an internal surface of an axially extending flange 45 formed on a mounting ring 46 attached to the combustor end wall 47. It is found, in practice, that the smooth flow characteristics of the fuel injector can be improved by providing a flared lip 48 on the periphery of the mounting ring flange 45 which protrudes a short distance into the combustion chamber volume 20. In effect the flared lip 48 becomes a radially outward extension of the integral injector lip 43. Atomized fuel and air are thereby appropriately placed within the combustion chamber 20 in order to support efficient combustion.

The avoidance of turbulent flow in the air which flows over the surface of the lip 43 ensures that regions of fuel/air mixture recirculation do not occur around the fuel injector 25. Consequently regions of overheating are thereby largely avoided.

However, two effects have been observed which can mitigate some of the benefits brought about by the invention. Any recirculatory flow which does occur on the radially outer side of the mounting ring 46 is fed with only a small flow of leakage or bleed cooling air metered through small effusion holes in the radially flanged portion of the ring 46. As a result the residence time of this air can be sufficiently long to cause incipient overheating. The second effect arises as the fuel injector is permitted to move axially relative to the end wall 47 either as a result of differential thermal expansion or as a control function. Such differential movement of the cooperating lips 43 and 48 can produce a discontinuity in the smooth lip profile producing second order flow eddies in the outer sheath of cool air resulting, at times, in recirculation zones adjacent the combustor end wall. The end wall 47 is normally provided with a heatshield on its combustor side and a flow of cooling air is allowed to bleed into the region around the circumference of the injector mounting ring 46. This bleed flow can be trapped by an injector flow recirculation pattern, denoted by arrows 49. Unfortunately the bleed flow has a relatively low mass flow rate, compared to flow rate of airstreams through the injector itself. As a result residence time adjacent the face of the heatshield is increased and therefore its efficiency reduced.

FIG. 4 shows a flow circulation diagram for the first embodiment of the invention illustrated in FIG. 3. There is shown a combustion chamber in which the upstream wall 47 of the combustor lies in a radial plane and the injector forms a wide cone angle fuel/air mixture distribution. The combination of flared lips 43 and 48 produces the desired flow characteristics in the combustion volume 20, but is also shown generating a recirculation of the relatively low mass flow bleed cooling air flow in region 49 on the lee side of the lip 48. Although the flared lips 43,48 achieve the desired wide angle flow pattern, the flared portion 48 forms part of the combustor rather than being part of the fuel injector. As a result the lip 48 remains behind in situ when the injector is withdrawn and, during use, relative axial movement between the injector and the combustor wall can disturb the flow pattern by creating a discontinuity in the lip profile.

The second embodiment of a multi-stream injector illustrated in FIG. 5 provides an injector design incorporating a flared lip wholly within the demountable portions of the injector. Those parts of the second embodiment of FIG. 5 which correspond to similar members in the first embodiment of FIG. 3 carry like references. Thus the main body 26 of the injector is unchanged, as are the integral frusto-conical members 35,36 which define the fuel orifice 34.

Radially outwards of the ring 36 once again there two concentric swirled air channels the constructions of which include the same swirler vanes 38,39. However, instead of the third and fourth concentric members 40,42 these are replaced by concentric members 52 and 54 which define the swirling air-stream passages. The inner member 52 now carries a coanda lip 55 and an outwardly flared lip 56 and is carried by the swirl vanes 38. These shaped lips 55,56 are preferably formed integrally with the third ring. The fourth and outermost ring 54 is now merely a plain cylindrical ring although it too is an integral part of the injector 25 and carried by the radially outer swirl vanes 39. The outer surface of the outer ring 54 is slidably engaged with a lip 57 formed in wall 47 surrounding and defining the fuel injector aperture.

There is now, in use, a fast flowing cool airstream on both radially inner and radially outer sides of the member 52 in annular channels 58,59 so that any recirculatory zone which occurs is now fed with a substantial supply of cool air. Whereas in the first embodiment, in addition to the fuel/air mixture stream, there were two airstreams radially inboard of the flared lip, in the second embodiment there are airstreams on both sides of the flared lip member.

Installed in a combustor the outermost concentric member 54 may be inserted into a mounting ring, as in FIG. 3, or into the closely fitting aperture 57 in the upstream end wall of the combustion chamber. The member 54 acts as a seal around the injector to prevent uncontrolled leakage of air into the combustion volume. The downstream rim of the outermost concentric or seal member 54 is substantially flush with the surrounding margin of the combustor end wall. Furthermore the diameter of the radially outwardly extending rim of the flared lip 56 extends no further radially outwards than the circumference of the member 54. Thus, the whole injector assembly of FIG. 5, including the flared lip portion, can be withdrawn from the combustion chamber as a single unit.

FIG. 6 shows a plot of air and fuel/air mixture flows issuing form the injector of FIG. 5. The drawing shows a part of a combustor from an injector center line outwards in a radial section. The combustor back wall is slightly dished, i.e. concave, radially outwards of the injector ports. With the fuel injector of FIG. 5 HP compressor air flows through the passages 58,59. Fuel issues from the passage 34 into the airstream in the center passage 29 and forms a plume of fuel/air mixture issuing from the frusto-conical nozzle. The concentric passage 58 immediately downstream of nozzle in combination with the flared lip 55, 56 has the effect of opening out the mixture plume into a wide-angle cone. Although some of the flow issuing from the injector in a wide angle cone is susceptible to recirculation in an effective "dead-zone" between the flow cone and the back wall 47 of the combustor this recirculation flow is at least almost wholly cold flow entrapped from the flow through channel 59 on the radially outer side of the flared lip member.

According to the modification of the present invention shown in FIG. 3 the passage 59 defined between the seal member 54 and the radially outer surface of the flared lip member 56 feeds a flow of relatively cool HP compressor air into the recirculation zone 60 between the wide-angle mixture cone and the back wall 47, as illustrated in FIG. 4. In addition, an effusion cooling flow through small cooling holes in the back wall in the region 61, for example as leakage flow from thermal wall protection tiles, if provided, is entrained into this recirculation of cooling air.

In the arrangement illustrated in FIG. 7 the shape of the combustor back wall 47 is modified to have a conical form surrounding each fuel injector. The cone angle is substantially equal to the cone angle of the fuel/air mixture cone. This eliminates the cooling air recirculation zone, as can be seen by comparison of the flow diagrams of FIGS. 6 and 7. The cooling air flow issuing from passage 54 now flows radially outwards from the fuel injector center line and parallel to the back wall 47. In this arrangement the effusion cooling flow through the combustor back wall may be dispensed with.

Although the present invention has been described with reference to a fuel injector passage which contains a flow of air, it will be appreciated that it could also be applied to a fuel injector passage which contains a flow of air and fuel if there is a danger of flow recirculation regions occurring in that fuel and air flow.

We claim:

1. A gas turbine engine fuel injector comprising a plurality of concentric members defining a plurality of concentric annular passages, including a fuel passage and radially outwardly thereof at least one further passage for the flow therethrough of air, an inwardly directed annular lip portion of a first concentric member defining the downstream end of said further passage, said annular lip portion having a radially inwardly directed curved first surface, a radially outwardly directed curved second surface, said first surface smoothly adjoining said second surface, and a radially outwardly extending curved third surface on the first concentric member, said first and second surfaces defining a cross-sectional shape such that in said further passage, air flowing over said inwardly directed annular lip portion remains attached to the surface of the lip so as to flow in a substantially non-turbulent manner initially in a generally radially inward direction and subsequently in a generally radially outward direction, wherein the second surface intersects the third surface to define an outwardly flared lip.

2. The fuel injector of claim 1, wherein a second concentric member is located radially outwardly of the first concentric member and an annular passage therebetween carries a flow of cooling air.

3. The fuel injector of claim 1, wherein said inwardly directed annular lip portion is of generally U-shaped cross-sectional shape.

4. The fuel injector of claim 1, wherein said further passage has a radially inwardly directed frusto-conical wall portion opposite said annular lip portion.

5. The fuel injector of claim 1, wherein an annular array of swirler vanes is provided in said further passage upstream of said first concentric member.

6. The fuel injector of claim 1, wherein the first concentric member and a radially outer second concentric member are relatively movable in an axial direction with respect to an endwall of a combustor chamber of a gas turbine in which the fuel injector is installed.

7. The fuel injector of claim 1, wherein the third surface cooperates with the downstream end of an immediately adjacent radially outward second concentric member to turn airflow in the passage therebetween in a radially outwardly directed wide-angle cone.

8. The fuel injector of claim 1, wherein the fuel injector is located in an upstream wall of a combustor and the outwardly flared lip is adapted to produce a radially outward flow of cooling air in contact with a face of a surrounding combustor wall.

9. The fuel injector of claim 1, wherein the fuel injector is located in an upstream wall of a combustor and the outwardly flared lip is adapted to produce a recirculation region of cooling air adjacent the combustor wall surrounding the injector.

10. The fuel injector of claim 1, wherein said outwardly flared lip extends no further radially outwardly than a circumference of said second concentric member.

11. A gas turbine engine fuel injector comprising a plurality of concentric members defining a plurality of concentric annular passages, including a fuel passage and radially outwardly thereof at least one further passage for the flow of air therethrough, an inwardly directed annular lip portion of a first concentric member defining the downstream end of the further passage, the annular lip portion having a radially inwardly directed curved first surface, a radially outwardly directed curved second surface, the first surface smoothly adjoining the second surface, and a radially outwardly extending curved third surface on the first concentric member opposing the first and second surfaces, the first and second surfaces defining a cross-sectional shape such that in the further passage, air flowing over the inwardly directed annular lip portion remains attached to the surface of the lip so as to flow in the substantially non-turbulent manner initially in a generally radially inward direction and subsequently in a generally radially outward direction, wherein the second surface adjoins the third surface to define and outwardly flared lip, and a second concentric member comprising of a cylindrical ring positioned radially outwardly of said first concentric member.

12. The fuel injector of claim 11, wherein said second concentric member is supported by an annular array of swirler vanes, said annular array of swirler vanes mounted on said first concentric member.

* * * * *